Patented Apr. 6, 1937

2,075,805

UNITED STATES PATENT OFFICE 2,075,805

MOLDING UREA CONDENSATION PLASTIC

Carleton Ellis, Montclair, N. J., assignor to Ellis-Foster Company, a corporation of New Jersey No Drawing. Application September 19, 1930, Serial No. 483,135

19 Claims. (Cl. 18—55)

This invention relates to resinous products derived by aldehydic condensation of urea and/or thiourea and/or other resinifying urea derivatives and the cellulose complex thereof.

The object of the invention is to provide a complex adapted for use in the plastic arts.

The complex may be considered from two standpoints: (1) as a primary complex; and (2) as a secondary complex.

The primary complex is constituted by either (a) urea aldehyde condensation products, particularly such products derived with the aid of formaldehyde; or (b) such products incorporated with a modifying agent of resinification, such as the condensation products of thiourea and an aldehyde, specifically formaldehyde, or a resinous material of the type of an acetone resin made by reacting on acetone with an aldehyde such as formaldehyde or various other resinous modifying agents, as will subsequently be more fully described.

In one modification of the present invention urea condensation products in conjunction with sulphur-containing resins are used together to form the basis of a plastic or resinous complex. For this purpose there may be mentioned the employment of mixtures of urea and thiourea reacted with formaldehyde to form a plastic complex. The reaction between these urea materials and the aldehyde can be carried out in acid, alkaline or neutral solution. The present invention is in part concerned with production of an initial reaction product under conditions which are substantially neutral.

According to authorities, litmus indicates neutrality between a pH of 4 or 5 on the one hand (acid side) and a pH of 8 on the other hand (alkaline side). Within these limits there exists what may be termed a neutral zone defining neutrality as originally expressed in terms of litmus or similar indicators. In the present invention I prefer to conduct the initial reaction between formaldehyde and urea and/or thiourea, etc., within the limits of such neutral zone. If the formalin solution employed is not adequately neutral it may be suitably neutralized to bring it within this neutral zone.

Period of heating

Reaction between the urea materials and the formalin may be carried out at elevated temperatures but below the boiling point of the liquid. Or a definite temperature of reaction, namely, the boiling point may be taken and the time of heating reckoned on that temperature. Within the neutral zone the reaction takes place with a sufficient degree of rapidity at the boiling point (which is usually a degree of two below 100° C.) permitting a syrupy product to be prepared by conducting the reaction for periods ranging from 15 minutes to 2 or 3 hours. Considered from the standpoint of pH the time of reaction may be stated in a very rough way to vary inversely as the hydrogen ion concentration increases. During the heating there is usually a very slight increase in pH value. The change in pH by heating, therefore, is very slight and apparently does not at any time carry the reaction mixture out of the neutral zone when the reaction has been initiated under said neutral conditions. Therefore operating under these conditions I may start with an initial pH ranging from 7½ or 8 down to 4 without sacrificing that condition of neutrality expressed. Preferably the reaction is carried out at atmospheric pressure employing a reflux condenser which substantially prevents the admission of air during the reaction. In other cases reaction may be carried out in autoclaves at pressures above atmospheric.

Relation of heating to drying

The time of heating is in some manner connected with the release of moisture from the resinified material during the drying period. Certain conditions are imposed with respect to drying temperatures in order to prevent conversion of the material during drying to a stage where it will not flow properly in the mold. As will be subsequently more fully discussed, a material of the cellulose type preferably is incorporated with the resin, especially while the latter is in its intermediate syrupy stages. Thereupon the material is dried. This may be conducted in a vacuum dryer. A procedure which allows the employment of cheaper equipment is drying in the open as, for example, air drying followed by exposure to a gentle heat. A simple manner of drying is to expose the composition on screens made from nickel or Monel metal wire placed in a drying room through which a circulation of air is maintained to heat the material to a temperature of, say 40 to 50° C. More rapid drying may be brought about by using treated air that has had the moisture removed. It is possible to advance the temperature to 60 or 70° C. or even higher in some cases, provided the time of heating is not protracted to cause objectionable precuring. While the composition is still quite moist the higher temperatures may be employed rather freely without danger of pre-curing. But as soon as the bulk of the moisture has departed then there arises this danger. It is better, therefore, to dry at lower temperatures, for example, around 50° C., or perhaps slightly higher, to avoid pre-curing difficulties. Considerations in connection with the drying operation are particularly referred to in my Patent No. 1,905,999, granted April 25, 1933, entitled "Catalyzed urea resins".

Avoidance of discoloring metals

The reaction preferably should be carried out in glass or enamel vessels or in those made of aluminum, Monel metal, or similar non-discoloring metals. In drying, as indicated, Monel metal screens, and so forth, of a kind which will not cause discoloration preferably should be used.

Cooling the reaction mixture

On the large scale a reaction receptacle may be provided with a coil through which a heating or cooling fluid may be introduced. For example, steam may be passed through in order to heat the mixture and then, if the reaction becomes too violent, cold water may be passed through these same coils to check the turbulence of the reaction.

Incorporation with cellulose

Cellulose in its various forms may be employed, including the crude form, such as ground wood or wood flour, and more purified forms of cellulose, such as paper, cotton flock, linters, and the like. A suitably purified form of paper is alpha cellulose in sheet form. In incorporating cellulose with the syrup care should be taken to have present enough water to permit all the fibres of the cellulose to be well impregnated with the solution. Preferably the syrup, diluted with water or undiluted, as the case may be, is mixed while hot with the cellulose. The latter preferably is also heated prior to introduction into the syrup. Thorough impregnation is important in order to secure that change in the character of the cellulose which results in the production on hot pressing of translucent articles.

Impregnation by a vacuum and pressure

Impregnation of cellulose fibre may be conducted by a vacuum and pressure process, as set forth in my Patent 1,905,999. Impregnation adequate to fill the canals of the fibres in a substantially complete manner tends to yield the highest degree of transparency or translucency in the finished molded article or laminated sheet. A vacuum of, for example, 20-25 inches or thereabouts of mercury may be employed followed by a pressure of 50-100 lbs. or higher, as desired.

Introduction of coloring material

Owing to the colorless character of the product if made according to the foregoing directions, only a small amount of dye is required to create a strong coloring effect. For example, from a half gram to one gram of a dye such as rhodamine suffices to strongly color from 5 to 10 kilos of the composition. Soluble dyes may be added to the syrup before it is reacted with the cellulose material. Material pigments may be incorporated with the dried composition during ball mill grinding, if this step is carried out. When the syrup has been made with the aid of thiourea or similar sulphur resins, care should be taken not to use a pigment which reacts with sulphur to cause an undesirable change in color.

Drying the composition

If the filler is in sheet form as, for example, alpha cellulose, impregnation may be conducted, for example, by passing the dry sheets through the hot syrup. If the cellulose is in loose fibrous form, it is stirred thoroughly with the hot syrup and the product in either case is preferably dried at a temperature ranging from 40-75° C., the manner which I have already indicated being suitable. Drying at room temperatures and at higher temperatures ranging from 50-60° C. may be carried out or vacuum drying up to 50° C. may be used. In some cases higher temperatures are employed as, for example, when drying is carried out in a vacuum dryer. For example, drying was carried out by exposure at 90° C. in a vacuum dryer for one hour, until the mass had a crisp and brittle feel. In the latter instance the syrup was incorporated with a mixture of wood flour and titanox, or titanium oxide.

Grinding the composition

When a composition is required which is to be pressed in a plunger mold or used for pressure-casting, preferably it should be ground fairly fine, or at least the coarse lumps of matted material coming from the dryer should be broken up. A suitable procedure is to place the dried charge in a ball mill, which has no interior parts of iron or other discoloring metal, and grinding until the composition has been reduced to a stage of fineness such that it will pass a 40 mesh sieve. While I have specified a product passing a 40 mesh sieve, I may employ finer or coarser gradations, as desired. Of course, when the product is to be handled in sheet form grinding will not be required.

Introduction of mold lubricant

During the grinding pigments and mold lubricants may be introduced as set forth in Patent No. 1,905,999.

Molding pressures

The composition then is ready for molding, which may be conducted by means of charging the material into the cavities of plunger molds and submitting to hot-pressing. In molding the compositions of the type specified herein I find a certain range of pressures yields shaped products of good definition and surface finish. The preferred pressure range therefore extends from one ton to one and one-half tons per square inch of mold surface and this pressure should ordinarily be indicated by a gage on the press. There are conditions where a departure from this preferred range may be required, especially in the direction of higher pressures for certain resistant compositions, particularly those having a high content of special fillers.

Temperature of molding

Unlike phenol formaldehyde resinous plastics which are capable of being subjected to relatively high temperatures without disturbance, the molding compositions made with the urea type of resins are notably sensitive to temperatures above a certain relatively low limiting point. On the other hand, curing is too slow when molding is carried out at an inordinately low temperature. Moreover the rate of transmission of heat to the mold should be considered. Temperatures registered by electrically heated platens usually should range between 100° or 110° C. up to about 150° C. A good optimum temperature range is between 125° and 140° C. In molding with steam heated platens the transmission of heat is usually slower and misleading results are returned if the assumption is made that the temperature of the mold when steam is used as the heating agent is equivalent to that represented by the steam pressure on the supply line. The temperature of the mold in these conditions is usually substantially lower. Molding temperatures below the above stated maximum may vary between 110–130° C. and 125–150° C. depending on the materials, etc.

Avoidance of blistering

Attention may be called to the effect which the presence of cellulose imparts of greatly reducing blistering tendencies. The introduction of wood flour (with or without a white pigment or other pigment material) reduces the tendency to blistering. This and other effects which have been previously recorded by me indicate an action by the cellulose material to be something more than that solely of the role of a mere extending agent or filler.

If mechanical water is well removed from the composition by carefully drying up to, say, 65–75° C., a substantial proportion of cellulose (at least 25 per cent of the composition) has been used and the preferred maximum of 150° C. molding temperature is not exceeded, blistering difficulties are unlikely. Water which may be present in the mold and become converted into steam with formation of blisters is in part due to the reaction of condensation which may liberate water during the thermo-setting. Such water may be termed latent water. While mechanical water may be removed by drying, the latent water liberated in the mold cannot be readily freed from the molded article except that part which is liberated near the surfaces of such articles. The cellulose material, especially hydrocellulose, is useful in absorbing latent water. Thus a hydrocellulose cellulosate which may have become considerably dehydrated during drying can become more or less rehydrated during hot pressing due to absorption of latent water of condensation. This, therefore, in a sense is merely a transfer of water.

Breathing the mold, and spraying with water, may be carried out in some instances, as pointed out in my Patent 1,905,999.

Duration of curing in the mold

The curing time should be rendered as brief as possible. For thin moldings a molding time of from 2 to 5 minutes is desired. For thicker articles up to 10 minutes, or even longer, may be needed. The composition, therefore, should be as heat sensitive as is feasible consistent with adequate flow. Sometimes it is desirable to add to the dry composition a catalyst such as urea phosphate or nitrate which will speed up the curing time and increase water resistance.

Curing catalysts

As noted in the foregoing, acceleration of curing by the addition of catalysts sometimes may be required. These may be direct acting, that is capable of exerting acceleration of reaction at all times, or they may be latent, that is active only when a given temperature is reached. I have noted that rapidity of molding is a very important consideration owing to the high labor cost of such manipulation. Hence any procedure which will shorten the time the composition is taking its final shape in the mold is of importance. With white articles sensitive to higher temperatures than those specified, the duration of molding may be adjusted or accelerated by the presence of an acid catalyst present in an amount adequate to meet the particular requirements. I have pointed out that sometimes it is desirable to carry out the initial reaction between urea and formaldehyde, paraform or other aldehyde employed, in an alkaline medium to the point where particles begin to precipitate and that instant to arrest the action by the addition of acetic or other acid to approximate neutrality. If the alkali is allowed to react beyond a certain point the reaction batch may solidify to a magma or white pasty substance which cannot be used advantageously for pressure casting, although it may be dried out and used in hot-pressing. Therefore, before the liquid starts to thicken with separation of the reaction product, it is neutralized. Thereupon an acid catalyst may be added in such proportion, with or without cooling, as may be desired with reference to the speed of setting. Citric and oxalic acid, phthalic anhydride and other acid bodies mentioned in my prior applications may be used for the purpose. In some cases urea phthalate, and the like, may be employed. As latent catalysts there may be mentioned some of the amine hydrochlorides, also various salts of alkyl sulphuric acid, e. g., sodium or barium ethyl sulphate which decomposes at 120° C. into ethyl alcohol and sodium bisulphate. The latter is an active accelerator of hardening. The proportion of catalyst may range from less than 1/100 of a per cent up to several per cent. In some cases fluxing catalysts may be used, that is bodies which tend to have a fluxing effect in the first instance, such as glycerol chlorohydrin and then as the temperature of the mass in the press increases a breakdown occurs with liberation of catalytic material.

Translucency

A very important feature of articles made from cellulose and these urea condensation products is their translucency. This is a quality which hitherto has been difficult to secure in non-inflammable plastic material of relatively low cost. Translucency may be aided by thorough incorporation of cellulose and the urea syrup, preferably allowing adequate time for the hot solution to react with the fibre. Drying, moreover, should be thorough. Mineral pigments should be absent, in their place soluble dyes being used. As already noted under lubricants, the presence of more than a very small percentage of zinc stearate tends to decrease the translucency. Another method of improving translucency is to use fairly high pressures during molding, as, for example, 2,000–4,000 lbs. Higher pressure possibly brings about further reaction between cellulose and the urea material to form more fully reacted cellulose, thereby increasing translucency.

Opacity

On the other hand, when opaque products are desired the addition of a few percent of a mineral pigment suffices. If a white article is desired a number of the white mineral pigments are available, particularly those which are not discolored by sulphur (this consideration applying if a sulphur resin is present). Pure titanium dioxide, or its commercial embodiment known as titanox, is a useful white pigment and may be used in conjunction with the cellulose in various proportions. Lithopone is even better in some respects. In no case does it appear necessary to employ more titanox than corresponds to equal proportions by weight of this titanium pigment and cellulose. In the majority of cases a considerably lower proportion of the mineral pigment suffices. This is notably true when the pigment possesses a strong pigmenting power.

Molding then baking

The step of hot molding may be followed by a baking or stoving treatment. The composition can be given a preliminary rapid molding and the shaped article in a semi-cured condition is then placed in an oven and subjected to a baking temperature, for example, 100° C., for a period of two or three hours. This brings about a further hardening and increased resistance to water. In other cases a milder heat may be employed. Thus molded articles or pressed sheets may be baked at a temperature, for example, of 60–70° C. for half an hour or longer, depending on the thickness of the pressed product. A baking range of 60–100° C. is therefore permissible, but care should be taken that the baking oven is not too hot when the semi-cured articles are first placed therein, otherwise warping may ensue.

Laminated sheets or masses

By hot-pressing sheets of impregnated paper or pulp, laminated sheets or other articles may be produced. The preparation of laminated sheets or masses may be carried out as set forth in Patent No. 1,905,999.

In carrying out the molding or hot-pressing of such material, the shreddings may first be tableted if desired and then molded at the requisite temperature. The molds may have surfaces which give an embossed effect or print in raised or depressed letters any desired name or emblem. In some cases fillers may be incorporated with the paper sheets.

Veneering

In the same category as laminations are included veneered products made by hot-pressing a facing on a heavier or stiffer backing or support. The various veneering procedures for producing veneered products as set forth in Patent No. 1,905,999 may be employed.

Fluxing

For extrusion purposes or possibly in other cases, when a more plastic material is required, there may be added various fluxes, such as glycerine, glycol, diethylene glycol, and so forth. Some of the derivatives of these polyhydric alcohols, such as the halohydrins, including glycerol dichlorohydrin, may be used. In some cases the addition of 2 or 3 per cent of thiourea in the charge when it is being ground in a ball mill serves to bring about adequate fluxing.

Incorporation of other resins and plastic bodies

In the foregoing I have referred to various modifying resins, such as phenol aldehyde resin, acetone aldehyde resin, sulphur phenol resin, and others. Various proteids, as indicated in my prior applications, may be used as modifying agents including casein glue and gelatine Irish moss, algin, albumin, dried blood, and the like. These may be used in all proportions and therefore it is not necessary to set forth any specific formula. Vinyl resins, being capable of production of a light color, may be used in some cases with the light colored urea resins to yield various products such as those described above in which the vinyl resin exerts a modifying influence. By urea resin I include also urea-thiourea resin, and the like.

Water resistance

Tiles and many other articles, such as bathroom equipment, must exhibit water resistance and for this purpose it is desirable to use thiourea in conjunction with urea. The higher the proportion of thiourea the more positive the water resistance. It is, however, not necessary to go beyond a certain proportion in order to secure sufficient water resistance for all practical purposes. Thiourea is more costly than urea and therefore should be used in as low a proportion possible consistent with meeting commercial requirements. Even as low as 1 part of thiourea to 9 parts of urea has a considerable influence on the action of moisture. Ordinarily good water resistant molded articles can be made from compositions in which 10 to 20 per cent of the urea is replaced by thiourea. Using thiourea a wider range of molding temperature is secured, but on the other hand the thiourea is more sluggish in its curing properties and therefore is not always as suitable for commercial work. For a great majority of purposes in which a thiourea composition is desired a proportion of ⅓ thiourea to ⅔ urea is the maximum required of the more expensive thiourea ingredient. The present invention however, while allowing the use of thiourea in some cases, has as a particular object the production of molded articles from urea alone without the thiourea component which will be highly water resistant. Heretofore it has been supposed that thiourea was necessary in order to secure water resistance, but by proceeding according to the preferred methods set forth herein with respect to the urea compositions alone, a degree of water resistance from such products is obtainable which apparently well exceeds products in which thiourea is an ingredient. This is highly important in view of the fact that thiourea is relatively expensive while urea is produced in great quantities for fertilizer purposes and I have found such fertilizer urea is suitable for the purpose of making water resistant products, especially containers intended for domestic use such as plates or other dishes, cups, and the like.

Printing blocks

Using the plastic of the present invention I may make printing blocks or printing plates which may be molded directly from the original as a matrix. Such molded printing blocks may, if necessary, be hardened further by baking. Such blocks may be required to stand pressures of 450 lbs. per square inch. Type metal will stand only about 300 lbs.

Successive additions of cellulose

A procedure of significance from the manufacturing standpoint is the two-stage or multistage addition or incorporation of cellulose, such as alpha cellulose, cotton flock, linters, and especially ligniform material such as ground wood or wood flour. When compositions are made containing a relatively high proportion of cellulose, there is obtained a great bulk of material requiring a considerable time to dry thoroughly.

When the cellulose has been thoroughly wetted with the urea syrup, as the latter dries it goes through a gelatinous stage with possible difficulties from case-hardening or incrustation preventing thorough drying. If the temperature is raised to create a relatively strong heat, there is danger that the resin will become pre-cured. It is possible, however, to incorporate only part of the cellulose, using just enough to act as an absorbent for the syrup, e. g., to a syrup containing 60 parts total resin solids use 40 parts of wood flour. By thus using in substantially absorbing proportions or preferably optimum absorbing proportions, there is only a moderate mass of material (relatively considered) to be dried. After drying and preferably when incorporating pigments, mold lubricants, and the like, in the ball mill, there may be added at any suitable stage, but preferably after the impregnated cellulose has been ground, an additional quantity of the cellulose material which is unimpregnated, that is, the normal fibre or ground up wood stock. A thorough mixing is made of the impregnated and unimpregnated cellulose either, as indicated, by ball mill mixing and grinding or by running through a comminuter. The initial charge or absorbing portion of the cellulose may be called the primary cellulose and that which is added to the dry unimpregnated material at a later stage may be termed the sequential or secondary cellulose. Thus to an impregnated batch made in the proportion of 40 parts cellulose to 60 parts of the dry solids of the urea syrup there may be added an equal amount, i. e., 100 parts of wood flour as the sequential or secondary cellulose. Thus there would be obtained a mixture in which 40 parts of wood flour impregnated with 60 parts of the resin were mixed with 100 parts of unimpregnated wood flour sequentially added, giving a finished molding composition with 30 per cent urea binder to 70 per cent wood flour. Similarly there may be added as the sequential charge, 125, 150, 200 or 300 parts wood flour, giving percentages of the latter reckoned in the finished molding composition as about 27%, 24%, 20% and 15%, respectively.

*Disappearance of ligniform structure*

There appears to be, to some extent at least, a solution or absorption of cellulose by the resinified urea material when the reaction of hardening or curing is allowed to take place under heat and pressure. In any event, there is to the eye a disappearance of fibre to some extent which constitutes virtually a delignification. Wood flour with its component of lignin appears to be especially useful in this respect, which may be due in part to the presence of the lignin. When additions of wood flour substantially beyond the absorptive capacity of the urea component are employed there may be obtained after pressing articles somewhat resembling wood which may be used as artificial lumber.

*Addition of catalyst to the sequential cellulose charge*

After drying the composition with its primary charge of cellulose, the introduction of the secondary or sequential charge of cellulose to the dry batch permits of the addition of catalysts in a disseminated form, i. e., distributed in the pores of the particles of the sequential charge. Thus an acid catalyst, such as boric, phosphoric, phosphomolybdic, silicotungstic, or other mineral acid or acid salts, e. g., bisulphates, alum, zinc chloride, and the like, alkyl sulphuric acid, various organic acids, such as formic, acetic, trichloracetic, lactic, citric, tartaric, succinic, phthalic, salicylic acids (or their anhydrides, as the case may be), singly or in admixture, dissolved in water or other appropriate solvent, and the sequential charge of, for example, wood flour is wetted with the solution. Each particle of the wood flour thereby receives its quota of the catalyst. The latter then is air-dried or heated as may be required to remove moisture or solvent. Volatile acids such as formic and acetic acids, although mentioned in the foregoing, are not considered as suitable because the cellulose material cannot be as thoroughly dried without volatilization of a part of such acids. The sequential charge of cellulose if thoroughly dried serves an important function with respect to prevention of blistering, as will be noted later.

*Acidulated wood flour catalyst*

Wood flour varies with the grade of the wood, depending on whether pine, spruce, fir, and the like, are employed in its production. Cedar sawdust or cedar wood flour has characteristics different from the aforesaid woods. Sometimes harder woods may be used; likewise ground bark, such as that of the sequoia. The proportions therefore in both the primary and the secondary charges will vary with respect to the absorbent character and other properties of the cellulose material. Any of these, however, may be charged with a specific hardening catalyst, usually of an acid character, although in some cases of an alkaline nature to render the whole catalytic in bringing about rapid curing in the mold. If the catalyst is introduced in this way it does not come into active contact with the urea resin binder until the latter is molded under the heat and pressure of the mold. Different types of cellulose may be used for the primary and secondary charge. For example, a very finely ground pine wood may be used as the absorbent charge and cedar sawdust or flour used as the secondary charge.

It should be noted that certain commercial grades of wood flour, especially those containing a rather high proportion of bark, exhibit a considerable degree of acidity. This is due largely to water-soluble acids. When such acid wood flour is used by directly impregnating with a neutral urea-formaldehyde syrupy resin solution, the water present in the syrup dissolves some of this free acid from the wood flour modifying the pH value and frequently increasing the acidity to a degree which brings about an undesirable advance of the reaction of the syrupy binder. This reaction may, and usually does, continue throughout the drying process and even during storage, with the result that eventually the resin binder is so far reacted that it will no longer flow under heat and pressure. When, therefore, such acid grades of wood flour filler are used it is desirable and frequently highly important to neutralize this free acid, in part at least, such neutralization preferably being carried out before impregnation or in any event before the drying operation. On the other hand, if the wood flour filler should contain alkaline substances derived through some condition of handling, it is likewise desirable to neutralize such alkalinity as otherwise the curing time in the pressing operation may be unduly prolonged; alkalis tending to slow the curing reaction to a highly undesirable degree in most cases.

Bone-dry secondary cellulose

When the urea resin material is reacted under heat and pressure to cure it, a certain amount of volatile material, principally the latent water of reaction, is liberated. There is also usually present some mechanical water which has not been thrown off completely in the drying step. This water may be a disturbing factor in the mold, causing blistering. The difficulty is especially noticeable with urea formaldehyde resin, that made from urea-thiourea formaldehyde being less likely to blister. However, troubles arise in both cases. Breathing the mold is one way of avoiding blistering, but it is an operation which should be avoided if possible and is not always a certain remedy. By using a secondary charge of wood flour which has been heated thoroughly to render it quite dry the composition acquires a high proportion of the water absorbent. The absorption by the bone-dry wood flour of that amount of moisture which normally would be present suffices to take up all water otherwise creating disturbing conditions in the mold and this compensation of water evolution allows the production of smooth, well molded articles, free from blistering.

A considerable number of illustrations are hereinafter given in which the same ratio of urea, thiourea and formaldehyde is maintained. This is illustrative in that it affords a desirable basis for comparison. However, by using these stated proportions for comparative purposes I do not wish thereby to limit myself either to proportions or to the precise character of the raw materials, it being understood that I may make combinations and additions in various ways and with various materials within the scope of the invention.

In the illustrative examples the proportions given are parts by weight.

In addition to the examples particularly given in my prior Patent No. 1,905,999, the following examples of carrying out the invention are set forth.

*Example 1.*—One part by weight of urea and 2 parts by weight of aqueous formaldehyde of about 40 per cent strength were used. The pH of the formaldehyde was 7. Half of the urea was added to the formaldehyde at room temperature. Heat was then applied and when the temperature had reached about 90° C. the remainder of the urea was added. The temperature then was raised to the point of ebullition, which was approximately 95° C., and reaction was carried on for a period of 5 minutes. To the above reaction mixture $\frac{1}{10}$ of a part of wood flour was added and impregnation allowed to take place. The pH of the wood flour tested by leaching it with boiling water was 6. This composition was dried until the temperature in the drying oven reached 65° C. On testing in the hot press this composition showed a perfect flow in the die at a temperature of 125° C. and at much lower pressures. There was no sign of blisters. The resistance to boiling water of molded articles made from this composition was satisfactory.

*Example 2.*—One part by weight of urea, 2 parts of formalin, pH 4.6, were used. The urea and formaldehyde were mixed at room temperature and heat applied. When the temperature reached 35° C., one-half of one per cent of light magnesium carbonate was added to the solution. The pH changed immediately to 7.8. The solution was reacted for 30 minutes at the boiling temperature and then was used to impregnate one part of wood flour (pH of extract obtained by boiling the wood flour at 100° C. was 6). The moist product was dried for 12 hours and was then found to grind well in the ball mill. Then there was added $\frac{1}{10}$ of one per cent of urea nitrate. The material thereupon flowed at 2 tons per square inch when pressed at 125° C. A perfect molding was obtained. In boiling water the molded article was unaffected by 10 minutes exposure. To another portion of the same batch $\frac{1}{10}$ of one per cent of orthophosphoric acid was added. The product cured nicely, flowing at somewhat higher pressures, however, but giving a perfect molded article. Exposure of the article in boiling water for 20 minutes did not show deterioration. It should be noted that the urea nitrate and the phosphoric acid catalyst were best added by dissolving in a volatile solvent, such as methanol, and impregnating the molding composition therewith, then drying.

*Example 3.*—2,000 parts formalin (37.5 per cent, pH 7), 747 parts of urea, 267 parts of thiourea. The urea and formaldehyde were mixed cold at room temperature and .5 per cent of magnesium carbonate was added. Heat was applied and 10 minutes after the reaction started the thiourea was added to the solution. 20 minutes later the solution was incorporated with 1,000 parts of wood flour, (pH of the latter, obtained as above, is 6). Drying took about 18 hours and it was necessary to raise the temperature to 85° C. in order to dry out sufficiently so that grinding in a ball mill could be carried out. This material flowed at one ton per square inch. Water resistance good, 20 minutes exposure in boiling water showing no attack.

*Example 4.*—One part by weight of urea, 2 parts of formalin, pH 7. The urea and formaldehyde were mixed at room temperature, brought to the boiling point and reacted for 20 minutes then used to impregnate one part of wood flour (pH 6, determined as above). The moist composition was dried rapidly until a temperature of about 65° C. was reached. Then there was added to it an equal weight of composition made according to Example 17, together with ¼ of one per cent of urea nitrate. A good flow was obtained on pressing and the water resistance was excellent. The molded article was practically unaffected at the end of 40 minutes.

*Example 5.*—One part urea, 2 parts formalin, pH 4.8. Urea and formalin were mixed at room temperature, brought to boiling point and reacted for 10 minutes. $\frac{1}{10}$ part of wood flour was used for impregnation (pH 6, determined as above). Drying out in a well ventilated drying oven was carried on until the temperature of the mass reached about 45° C. This material flowed well. On addition of urea nitrate as a catalyst, introducing $\frac{1}{10}$ of one per cent by means of a methanol solution, the dried material flowed well in the press. In order to increase the flow, 5 per cent of urea on the weight of the total material, together with $\frac{1}{10}$ of one per cent of urea nitrate were added to another portion of the same batch, employing an alcoholic solution for impregnation. A very interesting result was obtained. While the initial pressure in the die appeared to be about 5 tons, it was noted that this dropped in the course of a few seconds as the urea plasticizer exerted action and the flow became free at as low as 2 tons, producing a perfect molded article. By closing the die slowly the initial pressure indicated was 3½ tons, falling suddenly to 2 tons. This material had good water resistance and a 5 minute cure in the press gave molded articles which showed resistance greater than 30 minutes in boiling water.

*Example 6.*—Urea one part, formalin 2 parts. The latter had a pH of 7 and a strength of 37.5 per cent formaldehyde. This proportion of urea and formaldehyde corresponds to the formation of equimolecular proportions of monomethylol urea and dimethylol urea. I prefer to use as the principal thermo-plastic ingredient a ratio of this character, preferably having the pH so adjusted that the mixture of monomethylol urea and dimethylol urea will readily form.

The mixture was heated, reaching the point of ebullition in 15 minutes and being kept at that temperature for 10 minutes when $\tfrac{1}{10}$ per cent of wood flour (pH 6, obtained as above) was incorporated and drying carried on at a temperature gradually increasing to about 55° C. over a period of 2 hours. The flow in the hot press was fairly good, breathing being necessary, however. On the addition of 3 per cent of lamp black breathing was not required. The addition of 3.5 per cent of lithopone accelerated the curing time. The lamp black, lithopone, vermilion, or whatever pigment is used, preferably is admixed with the dried material in a ball mill.

*Example 7.*—When urea resin, with or without thiourea, is dried without any filling or extending agents, it is likely to form a hard glassy substance which is very difficult to pulverize. It is possible to dry the concentrated syrup by spraying with heated air. A mixture of 400 parts by weight urea, 780 parts formalin, 37.5 per cent, pH 6.8, were heated under a reflux condenser for 30 minutes, then the condenser was removed and the syrup boiled down until there remained about 900 parts. This was sprayed with heated air at 70 lbs. air pressure. A white sugary powder was secured which was practically dry. This was mixed with wood flour together with a small percentage of zinc stearate and was molded. A portion of the sugary material was dried in the oven for several hours at 55° C. and also molded. This method of spraying permits of producing in pulverulent form a urea or urea-thiourea formaldehyde composition so that it may be easily incorporated with fillers, as by grinding together in a ball mill. In general it may be stated that best results in spray drying are secured when using aqueous formalin of about 40 per cent strength by carrying the concentration of the syrup to approximately half its initial volume.

The employment of urea and formaldehyde in proportions equivalent to a mixture of equal parts of mono- and dimethylol urea has been referred to. In other words, it is possible to react on urea with formaldehyde using a proportion of the latter greater than would be required to form monomethylol urea, but less than that needed for the complete conversion to dimethylol urea.

Further, various mixtures may be made of mono- and dimethylol urea derivatives using substituted ureas acting in a similar or equivalent manner. For example, a mixture of (a) monomethylol thiourea and dimethylol urea, or (b) dimethylol thiourea with monomethylol urea, or (c) mono- and dimethylol urea with mono- and dimethylol thiourea.

I have called attention to the desirability of using for molding purposes a mixture of mono- and dimethylol urea in various proportions as, for example, the use of equal parts by weight. This proportion is equivalent to one mol. of dimethylol urea to 1⅓ mols monomethylol urea, corresponding to a ratio of urea to formaldehyde of 4:2.86, that is, approximately in the ratio 4:3.

It should be noted that the latter ratio calculated to a mixture of di- and monomethylol urea corresponds to equimolecular proportions as indicated by the following reaction:

In the preferred form of invention I prefer to use approximately such proportions of urea and/or thiourea and formaldehyde as would be required to yield the equivalent of a mixture of equal mols monomethylol urea and dimethylol urea. However, as stated, variations from this proportion may be used preferably, however, limiting that variation somewhere near to the ratio 4:3, such, for example, as the employment of urea and formaldehyde in the proportion to yield the equivalent of equal parts by weight of the mono- and di- compound.

In bringing about the reaction between urea and formalin the proper proportions required to make the mixed methylol ureas or their equivalents may be reacted together or urea and formaldehyde may be separately reacted to form (a) monomethylol urea and (b) dimethylol urea or equivalent compounds. The liquids or products obtained by these reactions then may be mixed and incorporated with fibrous material containing cellulose.

Sometimes the reaction is desirably carried out in a medium of mixed aqueous and alcoholic components, methanol or acetone being suitable. The employment of organic solvents to dissolve or disperse the resinous bodies forming the complex, is feasible herein, but preferably I utilize an aqueous medium containing an alcoholic component reducing surface tension and aiding penetration, especially into wood fibre containing some natural resins and lignins. Translucency, oftentimes required, calls for effective penetration. Surprising results with pigmented wood flour thus may be obtained, the yellow to brown color imparted by ordinary wood flour to the complex being quite readily modified to pleasing tints of various sorts. Indications point to reaction, superficial or deep-seated, between the primary complex and the cellulose and/or lignin bodies present in ground wood.

Within the scope of the present invention thus there may be defined a process of making a resinous complex which comprises reacting on urea material (including resinifying derivatives and their mixtures), specifically urea, with a responsive aldehyde, specifically formaldehyde normally in aqueous solution, preferably in the presence of some methanol, preferably conducting the reaction hot, in a medium preferably of pH within the zone of litmus neutrality, using the aldehyde in a proportion greater than would be required to yield wholly monomethylol urea but less than would be required to form dimethylol urea, preferably incorporating the reaction material with cellulose fibre and drying at a temperature below 100° C. whereby a complex is obtained readily flowable under suitable heat and pressure and hardening when so heated and pressed, thermo-setting with especial ease when there is then present an acid catalyst of substantially complete resinification.

When proportions of urea (without thiourea) and formaldehyde, within the range of litmus neutrality calculated to yield the equivalent of a mixture of equal mols monomethylol urea and dimethylol urea, are heated under a reflux condenser in order to bring about the reaction to form a syrupy solution of the monomethylol (dimethylol) material, an insoluble body is formed which is not necessary to the successful utilization of the reaction product. This insoluble material appears as a white precipitate which does not dissolve readily in water nor in alcohol and which so far as the molding art is concerned remains substantially unchanged by the action of heat and pressure within commercial molding ranges. Sometimes after the reaction has been completed to the desired degree the insoluble material starts to form while cooling and it would appear that the formation of the material once started progresses even at normal room temperatures. Moreover this insoluble body or bodies being apparently inert in the composition acts more as a filler than as a binder and thus serves to reduce the content of active resin. The formation of the insoluble material is much more rapid when the reaction product is on the acid side and it is advisable to maintain this neutrality by the addition of a small proportion of alkaline substances. While it is possible to use the soluble substances like caustic soda or bicarbonate, and the like, I prefer to avail of the unusually effective properties of magnesium oxide or magnesium carbonate, especially such compounds used in their very light precipitated forms. Precipitated chalk likewise may be used but not as advantageously as the magnesium compounds. The latter, while not creating any undesirable degree of alkalinity, permit of rapid neutralization of any acid formed during the heating period. Careful experiments show that during the reaction there is a development of acid and the magnesium compound serves for its neutralization thereby maintaining a desirable condition of neutrality. In this way the reaction may be carried out to form simply the monomethylol and dimethylol material without separation of the inert compound. This phase of reaction tends to increase the strength of the molded article and to somewhat augment water resistance.

In order to test the resistance to water of utensils intended for domestic or restaurant use I preferably place the finished molded article in boiling water, submerging therein for a period of a half hour while the water is boiling vigorously and then allowing the sample to dry. At the end of 24 hours the surface should be examined for fissures and crazing. Urea-thiourea compositions heretofore have shown the most effective resistance in this way, but in accordance with the present invention employing urea alone I am able to secure a resistance according to this test which is phenomenal. An exposure of 40 minutes to boiling water has been found to have no appreciable action on the surface of a urea formaldehyde molded article quite free from thiourea. The same test conducted on a commercial grade of urea-thiourea molded material showed decided crazing. I have set forth the making of containers or dishes from urea formaldehyde material and the present invention has reference particularly to domestic utensils possessing sufficient resistance to hot water so that they may be cleansed repeatedly without destruction of their surface.

The production of water-resistant synthetic resin crockery-like ware according to the present invention calls for very great precautions, especially when the ware is to be white or cream colored. In the molded article white or light color particles of dirt embedded in the surface show with surprising distinctness. In making the syrupy or aqueous urea-formaldehyde-condensate, especially when using fertilizer urea, it usually will be necessary to filter to remove dirt and particles causing specks. The cellulose filler for such ware preferably should be a grade of high purity, substantially free from clay, sizing and other substances which may be present in ordinary white paper stock and prove detrimental for the purpose. A refined cellulose of the type of alpha cellulose is best for the purpose. In storage such alpha cellulose should be kept as free as possible from dust or contact with dirt. Comparatively few white pigments yield a product of sufficient whiteness for crockery-like ware of the whitest grades, in some cases in fact so large a proportion of the pigment being needed that the ware becomes brittle and is rather easily fractured on sudden impact. One possibility in accordance with the present invention is the production of what may be termed nonbreakable ware, this term being a relative one, meaning that ware made of this type is substantially nonbreakable as contrasted with ordinary china or crockery ware. When the latter is allowed to fall on a hard surface as, for example, when dropped on a concrete or tiled floor, it is of course ordinarily shattered, whereas dishes made in acordance with the present invention may be dropped repeatedly on such a floor usually without shattering or cracking. To all intents and purposes, therefore, the ware made in accordance with the preferred form of the present invention is nonbreakable. However, if too high a degree of pigment addition is needed for the desired shade of color, the degree of non-breakability suffers. Therefore, it is an object to employ a white pigment having the maximum degree of whitening effect coupled with absence of any harmful physiological action when the ware is used for household or table purposes. Of the white pigments titanium oxide has been found by far the most efficient and suitable for the purpose. It is capable even in small proportion of destroying the starchy appearance sometimes found in molded articles made from urea and refined cellulose alone. The quantity employed to obtain the degree of whiteness required does not impair the non-breakability of the tumblers, plates or other dish-like articles, receptacles, trays, and the like, producible in accordance with the present invention.

Using a high grade of clean cellulose, such as alpha cellulose, and a moderate amount of a safe pigment such as titanox, I am able to make dishes white in color resembling china or porcelain in greater or less degree which are adequately water resistant. Such articles are made from relatively cheap raw materials, the urea employed being preferably the commercial product of the fertilizer type costing but a few cents per pound in contrast to thiourea which under present market conditions costs 10 to 20 times as much.

*Example 8.*—Urea 1 kilo, aqueous formaldehyde solution, 37.5 per cent strength, pH 7, 1850 cc., light magnesium carbonate 1 g. This mixture was heated under a reflux condenser for a period of 2 hours. 2 gs. of magnesium carbonate then were added and to the syrupy solution there was added approximately $\frac{1}{5}$ kilo wood flour. The composition was dried in the oven which had a temperature of 85° C., but in which the material reached a temperature of approximately 56° C. After drying the composition was ground in a ball mill and to the charge in the latter was added 1 cc. of glycerol dichlorhydrin per 100 gs. of the charge. After this had been mixed for about 30 minutes there was added 1/10 g. of naphthalene and 1/4 g. zinc stearate per 100 gs. of composition.

A part of this composition was colored in one case by the addition of 5 per cent ultramarine blue and 2½ per cent titanium oxide, while in another case 4 per cent of an orange pigment was added to a part of the batch.

From this composition, using a pressure per square inch of 3500 lbs., dishes about 4½ inches in diameter weighing 40 gs. were made. When properly molded these withstood the boiling water test for over 40 minutes. The specific gravity of the molded article was about 1.33 (that of ordinary bakelite is about 1.35 and a cellulose acetate molding composition tested at the same time was found to have a specific gravity of 1.32). A molding range between 116° and 150° C. was tried using this composition. Using steam in the press at 40 lbs., with a platen temperature of 116° C. and a pressing time of 6 minutes, the cure was not adequate. With 55 lbs. of steam and a platen temperature of 128° C., pressing time the same, a fair cure resulted. At 65 lbs. steam, 140° C. on platen, 6 minutes pressing time, an excellent cure resulted. On molding for 7 minutes under like conditions the cured product was very satisfactory. At 75 lbs. steam pressure with approximately 150° C. temperature of platen, time of pressing 5 minutes, the molded product was not as satisfactory, showing signs of being subjected to overheat. In general a molding range between 120–150° C. is preferable with this specific type of composition with optimum platen temperatures around 140° C.

*Example 9.*—In the preceding example the employment of glycerol dichlorhydrin has been mentioned. It has a desirable action in the composition and preferably is used in the proportion of 1 cc. or slightly more per hundred grams of the dry molding composition, preferably being added to the latter while in the ball mill and without the use of any diluent. It may, however, be introduced at various other times and with a diluent such as methanol and the like. Commercial chlorhydrin frequently is acid and preferably should be neutralized before use, such neutralization being carried approximately to pH 7. By the addition of this small amount of a heavy solvent or flux of the nature of the chlorhydrin the flow is improved considerably, estimated with the proportions given at about 25 per cent. Another point which is quite important is that the composition so made can be readily formed into tablets or pills. Tablets made in this manner are not friable. The production of tableted urea molding composition has offered difficulty in the past as the powder does not appear readily to agglomerate in the tablet machines to give pills of adequate density for commercial molding requirements. The composition made with a wood flour filler and the like is usually quite flocculent and it is not a simple matter to charge a mold with powder in this form to introduce an adequate charge that will when hot pressed fill all parts of the mold and make a sharp clean replica. The addition of a heavy fluxing solvent such as the dichlorhydrin enables tableting to be carried out readily and a very satisfactory pilled molding composition to be produced.

*Example 10.*—Urea 1 kilo, 37.5 per cent formalin solution pH 7 1850 cc., magnesium carbonate 1 g. Heated under reflux condenser for 2 hours, then added 2 g. magnesium carbonate. Impregnated 1/10 kilo neutral wood flour. Dried in oven and ground in ball mill. To 1 kilo of the dried and ground composition added 100 gs. ultramarine blue and 25 gs. titanium oxide, together with glycerol dichlorhydrin in the amount of 1¼ per cent based on the dry charge. This dichlorhydrin was originally slightly acid and was neutralized to bring the pH from 4.4 to 6.6. Moldings carried out with this composition through a temperature range not exceeding 150° C., using a pressing time ranging from 3 to 6 minutes, gave good results.

*Example 11.*—Proceeding in a similar manner to the method described in the preceding example, adding to the final charge ¼ per cent zinc stearate to prevent sticking to mold, various colored products were prepared as follows. Vermilion color using 1 per cent of a lake color known as "Lake red" and 1 per cent of titanium oxide, incorporated with a batch in the ball mill. Lavender color using 1 per cent Lake red, 2 per cent titanium oxide and 2½ per cent ultramarine blue.

Grass green color. Before the solution of the resin was used to impregnate the cellulose filler added 2 gs. of neptune blue dye per kilo of urea used. After the charge was dried and ground in ball mill incorporated 5 per cent chrome yellow and 2 per cent titanium oxide. Ultramarine blue, using 10 per cent ultramarine blue pigment and 2½ per cent titanium oxide. Black added to the ground composition 2 per cent lamp black. The plain unpigmented composition when molded was translucent, the others opaque and exhibiting excellent shades of color.

*Example 12.*—In the foregoing reference has been made to the formation of a white precipitate during the heating of urea and formaldehyde and it has been noted that a part at least of this precipitate is practically inert as a binder in the molding operation. The addition of a small amount of magnesium carbonate or similar neutralizing substance which of itself is not soluble in the reaction mixture but neutralizes acid as formed has, as noted, a desirable effect. Thus using 1 g. of magnesium carbonate to 1 kilo of urea with 1850 cc. of formalin, pH 7, reacting for 30 minutes and then allowing to cool by standing overnight, a precipitate somewhat crystalline in appearance forms, but this is found to be quite soluble when the solution is reheated.

| Time of reflux | pH | Precipitate percent |
|---|---|---|
| 30 minutes | 7.8 | 10 |
| 60 minutes | 7.8 | 35.40 |
| 90 minutes | 7.8 | 60 |
| 120 minutes | 7.8 | 85.95 |
| 150 minutes | 6.8 | solid |

After standing for 21 days the proportion had increased slightly, but on reheating the precipitate went into solution completely, showing pH 7.8.

Thus it is possible to obtain an effective binding agent in which the entire amount of urea employed is utilized to fullest advantage.

*Example 13.*—Urea 1 kilo dissolved in 1850 cc.

aqueous formalin, 37 per cent strength, pH 5.4, heated under reflux condenser for 40 minutes and the syrupy material used to impregnate 400 gs. of alpha cellulose in the form of fine cuttings or choppings from sheet stock. This material was then dried until crisp and was ground in a ball mill. As a catalyst there was added in one case 1/16 of 1 per cent of urea nitrate and in another case 1¼ cc. per 100 gs. of the dry composition of glycerol dichlorhydrin of pH 4.4. The alpha stock used although neutral appeared to absorb acid, hence the pH was slightly altered over that employed in a number of the examples given above. A small amount of a finely divided metallic soap, perferably zinc stearate, is added as a mold lubricant, usually about ¼ of 1 per cent. In the present instance it was an object to produce a composition which when molded would yield white articles resembling crockery or porcelain. To obtain the degree of whiteness required from 3 to 5 per cent of titanium oxide was introduced. The materials were then ground in a ball mill to incorporate thoroughly.

Respecting the proportion of pigment, it should be noted that more pigment is required when the molded article has a thin wall than is the case when heavier sections are produced. The minimum amount of a powerful white pigment such as titanium oxide preferably is used, because some brittleness may result if a large proportion of the mineral filler is present. Since one object in making this white crockery-like material is to obtain dishes of a substantially unbreakable or shock-resistant character and since the greatest demand in this field would be for white articles, I find it preferable to employ substantially pure titanium oxide because so little of this mineral pigment is required to secure the requisite degree of whiteness and therefore the shock-resistance is only very slightly reduced by such addition.

With respect to a mold lubricant of the zinc stearate type, precaution should be taken not to use more than that amount which will allow the article to leave the mold freely. If zinc stearate is used in the amount of say 2 or 3 per cent it renders the composition very difficult of coherence in a tableting machine, hence the production of firm tablets is practically impossible. By keeping the proportion of the zinc stearate well below 1 per cent, preferably about ¼ of 1 per cent, tableting may be done efficiently. Hence it is within the province of the present invention to utilize a proportion of mold lubricant sufficient to secure a release from the mold but not of such content that tableting is precluded. In other words, the composition preferably contains a tableting proportion of mold lubricant, specifically zinc stearate.

Mold lubricants, especially those of the zinc stearate type, used freely in making a white composition tend to throw the color somewhat off the white into a cream. For this reason likewise the percentage of zinc stearate or other analogous or appropriate mold lubricant should for white material be kept below a tint-forming content. While ¼ of 1 per cent of zinc stearate does not alter the degree of whiteness, a proportion of 1 or 2 per cent is likely to do this and is therefore undesirable for white colors and pale tints. In like manner, therefore, I prefer to employ less than 1 per cent of mold lubricant in the white material. In other words, the composition preferably should contain mold lubricant below tint-forming proportions.

A composition which is made from urea without thiourea has an advantage in the molding room, namely that molds of stainless steel are not required, ordinary steel molds being suitable for the purpose. The thiourea material reacting on the steel tends to blacken it with the formation of iron sulphide which is transmitted to the molded article and stains it. A composition in which the binder is solely a urea-formaldehyde-condensate without thiourea therefore is considered better for making crockery-like ware than one containing thiourea, since the danger of action on steel molds is avoided.

Furthermore it should be noted that for many purposes stability of the molding composition in storage is important. If a composition cures spontaneously on keeping or at least to a partial degree so that flowing in the mold is unsatisfactory, such composition has only a limited range of market. In order to obtain compositions which will withstand storage in summer heat and the like I preferably keep the hydrogen ion concentration practically at the isoelectric point. Thus I prefer to have a value of pH 7 or between pH 6 or 6½ on one hand and 7½ or 8 on the other than to exceed these figures, especially on the acid side. With a composition in which binder and filler are approximately on the pH 7 basis most excellent stability and keeping qualities are secured so that the flow does not decrease materially even when stored for a reasonable time under the range of ordinary climatic temperatures.

Finally mention should be made of the very desirable proportions of urea and formaldehyde, proportions which, as previously noted, yield approximately a mixture of equal parts of or equal mols of mono- and dimethylol urea, since such proportions permit of availing rather completely of the formaldehyde to such an extent that after pressing or use as a lacquer or paper impregnum, and so forth, the resulting product or treated material is practically odorless so far as the urea-formaldehyde-condensate is concerned. Various proposals have been made by others involving relatively high proportions of formaldehyde and these proportions, since the formaldehyde is greatly in excess, yield products which on molding and converting into various articles are liable to retain an odor of formaldehyde or impart its flavor to foodstuffs in contact with the molded material. The present invention embraces among other features a dish-shaped or dish-like molded article free from formaldehyde odor. When made from clean wood flour or cellulose and the condensate aforesaid the article is so thoroughly devoid of odor that it is doubtful if judged from this standpoint alone it could be told from ordinary crockery ware.

What I claim is:

1. The process which comprises heating to a temperature below the boiling point in the proportion of approximately 1 kilo of urea and approximately aqueous formaldehyde of pH 7 containing actual formaldehyde adequate to form approximately the equivalent of 1 mol. each mono- and dimethylol urea, in the presence of magnesium carbonate; whereby a solution of urea-formaldehyde-condensate is obtained, adding an additional amount of magnesium carbonate, impregnating approximately 1/10 kilo of wood flour with said solution, drying at a temperature below 100° C., grinding and incorporating pigment, adding to the dry mix about 1 per cent of a heavy fluxing solvent including glycerol dichlorhydrin and hot pressing at a platen temperature between approximately 120–150° C. to form receptacle shaped articles of a hot-water resistant character.

2. The process which comprises heating to a temperature below the boiling point in the proportion of approximately 1 kilo of urea and approximately aqueous formaldehyde of pH 7 containing actual formaldehyde adequate to form approximately the equivalent of 1 mol. each mono- and dimethylol urea, in the presence of magnesium carbonate; whereby a solution of urea-formaldehyde-condensate is obtained, adding an additional amount of magnesium carbonate, impregnating approximately 1/10 kilo of wood flour with said solution, drying at a temperature below 100° C., grinding and incorporating pigment, adding to the dry mix about 1 per cent of a heavy fluxing solvent including glycerol dichlorhydrin, forming into tablets and hot pressing at a platen temperature between approximately 120–150° C. to form receptacle shaped articles of a hot-water resistant character.

3. The process which comprises heating to a temperature below the boiling point urea and approximately neutral aqueous formaldehyde containing actual formaldehyde adequate to form approximately the equivalent of 1 mol. each mono- and dimethylol urea, in the presence of an insoluble neutralizing agent; whereby a solution of urea-formaldehyde-condensate is obtained, adding an additional amount of an insoluble neutralizing agent, impregnating wood flour with said solution, drying at a temperature below 100° C., grinding and incorporating pigment, adding to the dry mix about 1 per cent of a heavy fluxing solvent and hot pressing at a platen temperature between approximately 120–150° C. to form receptacle shaped articles of a hot-water resistant character.

4. The process which comprises heating to a temperature below the boiling point urea and approximately neutral aqueous formaldehyde containing actual formaldehyde adequate to form approximately the equivalent of 1 mol. each mono- and dimethylol urea, in the presence of an insoluble neutralizing agent; whereby a solution of urea-formaldehyde-condensate is obtained, adding an additional amount of an insoluble neutralizing agent, impregnating wood flour or other cellulose material with said solution, drying at a temperature below 100° C., grinding and incorporating pigment, adding to the dry mix about 1 per cent of a heavy fluxing solvent, forming into tablets and hot pressing at a platen temperature between approximately 120–150° C. to form receptacle shaped articles of a hot-water resistant character.

5. The process which comprises heating urea and approximately neutral aqueous formaldehyde containing actual formaldehyde adequate to form approximately the equivalent of 1 mol. each mono- and dimethylol urea, in the presence of a neutralizing agent; whereby a solution of urea-formaldehyde-condensate is obtained, impregnating cellulose material with said solution, drying at a temperature below 100° C., grinding and adding to the dry mix a heavy fluxing solvent and hot pressing at a platen temperature between approximately 120–150° C. to form shaped articles of a hot-water resistant character.

6. The process which comprises heating urea and approximately neutral aqueous formaldehyde containing actual formaldehyde adequate to form approximately the equivalent of 1 mol. each mono- and dimethylol urea, in the presence of a neutralizing agent whereby a solution of urea-formaldehyde-condensate is obtained, impregnating cellulose material with said solution, drying at a temperature below 100° C., grinding and adding to the dry mix a heavy fluxing solvent containing glycerol dichlorhydrin, forming into tablets and hot pressing at a platen temperature between approximately 120°–150° C. to form shaped articles of a hot-water resistant character.

7. The process which comprises heating urea and approximately neutral aqueous formaldehyde containing actual formaldehyde adequate to form approximately the equivalent of 1 mol. each mono- and dimethylol urea; whereby a solution of urea-formaldehyde-condensate is obtained, impregnating cellulose material with said solution, drying, adding to the dry mix a heavy fluxing solvent and hot pressing to form shaped articles of a hot-water resistant character.

8. The process which comprises heating urea and approximately neutral aqueous formaldehyde containing actual formaldehyde adequate to form approximately the equivalent of 1 mol. each mono- and dimethylol urea, whereby a solution of urea-formaldehdye-condensate is obtained, impregnating cellulose material with said solution, drying, adding a heavy fluxing solvent, forming into tablets and hot pressing in ordinary steel molds to form shaped articles of a hot-water resistant character.

9. In the method of making molding compositions, the step of reacting urea and formaldehyde together to form an initial urea formaldehyde condensate in the presence of a water insoluble substance capable of neutralizing acid, and incorporating said condensate with a filler whereby a composition particularly adapted to hot pressing operations is secured.

10. In the method of making molding compositions, the steps including forming a urea-formaldehyde type condensate in the presence of a water insoluble neutralizing agent, incorporating said condensate with a filler, and adding a small amount of a fluxing agent thereto whereby a composition particularly adapted to hot pressing operations is secured.

11. In the method of making molding compositions, the steps of reacting urea and formaldehyde together to form an initial urea-formaldehyde condensate in the presence of a water insoluble substance capable of neutralizing acid, incorporating said condensate with a filler, and adding a small amount of a fluxing catalyst thereto whereby a composition particularly adapted to hot pressing operations is secured.

12. A molding composition particularly adapted to hot pressing operations comprising a urea-formaldehyde condensate containing a small amount of a water insoluble substance capable of neutralizing acid, a filler, and a flux.

13. A molding composition particularly adapted to hot pressing operations comprising a urea-formaldehyde condensate containing a small amount of a water insoluble substance capable of neutralizing acid, a filler, and a small amount of a fluxing catalyst.

14. A molding composition particularly adapted to hot pressing operations comprising a urea-formaldehyde condensate containing a small amount of magnesium carbonate neutralizing agent capable of neutralizing acid, a filler, and a small amount of glycerol dichlorhydrin flux.

15. A non-breakable, water-resistant molded article made of a urea-formaldehyde type plastic, a relatively large amount of organic filler, and a small amount of coloring agent, said plastic containing residuum derived from a small amount of water-insoluble neutralizing agent and residuum derived from a catalytic flux.

16. A non-breakable, water-resistant molded article made of a urea-formaldehyde type plastic, a relatively large amount of organic filler, and a small amount of coloring agent, said plastic containing residuum derived from a small amount of magnesium carbonate neutralizing agent, and residuum derived from a glycerol dichlorhydrin catalytic flux.

17. A tableted composition containing a urea-formaldehyde type condensation product, wood flour and a fluxing catalyst, in proportions to yield a density requisite for the formation of tablets, whereby the tableted composition may be charged into a mold and hot pressed to produce a sharp clean replica of the mold.

18. A molded article made from a urea-formaldehyde condensate containing a small amount of a water-insoluble substance capable of neutralizing acid, a filler, and a flux.

19. A molded article made from a urea-formaldehyde condensate containing a small amount of a water-insoluble substance capable of neutralizing acid, a filler, and a small amount of a fluxing catalyst.

CARLETON ELLIS.